(12) United States Patent
Lawrence

(10) Patent No.: US 10,839,029 B2
(45) Date of Patent: *Nov. 17, 2020

(54) PERSONALIZATION OF WEB SEARCH RESULTS USING TERM, CATEGORY, AND LINK-BASED USER PROFILES

(71) Applicant: GOOGLE INC., Mountain View, CA (US)

(72) Inventor: Stephen R. Lawrence, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 15/059,826

(22) Filed: Mar. 3, 2016

(65) Prior Publication Data

US 2016/0342695 A1 Nov. 24, 2016

Related U.S. Application Data

(63) Continuation of application No. 13/735,953, filed on Jan. 7, 2013, now Pat. No. 9,298,777, which is a
(Continued)

(51) Int. Cl.
*G06F 16/9535* (2019.01)
*G06F 16/95* (2019.01)
(Continued)

(52) U.S. Cl.
CPC ........ *G06F 16/9535* (2019.01); *G06F 16/248* (2019.01); *G06F 16/24578* (2019.01); *G06F 16/93* (2019.01); *G06F 16/95* (2019.01)

(58) Field of Classification Search
CPC . G06F 17/30867; G06F 16/9535; G06F 16/95
See application file for complete search history.

(56) References Cited

U.S. PATENT DOCUMENTS 2,532,826 A   12/1950  Hewson
5,006,218 A    4/1991  Yoshida et al.
(Continued)

FOREIGN PATENT DOCUMENTS

EP        1050830 A2   11/2000

OTHER PUBLICATIONS

Non Final Office Action for U.S. Appl. No. 13/735,953, dated Jun. 14, 2015, 12 Pages.
(Continued)

*Primary Examiner* — Charles E Lu
(74) *Attorney, Agent, or Firm* — Brake Hughes Bellermann LLP

(57) ABSTRACT

A system and method for creating a user profile and for using the user profile to order search results returned by a search engine. The user profile is based on search queries submitted by a user, the user's specific interaction with the documents identified by the search engine and personal information provided by the user. Terms for the user profile may be selected from the documents accessed by the user by performing paragraph sampling or context analysis. Generic scores associated with the search results are modulated by the user profile to measure their relevance to a user's preference and interest. The search results are re-ordered accordingly so that the most relevant results appear on the top of the list. User profiles can be created and/or stored on the client side or server side of a client-server network environment.

15 Claims, 12 Drawing Sheets

Related U.S. Application Data continuation of application No. 13/295,019, filed on Nov. 11, 2011, now abandoned, which is a continuation of application No. 12/778,869, filed on May 12, 2010, now abandoned, which is a continuation of application No. 10/676,711, filed on Sep. 30, 2003, now abandoned.

(51) Int. Cl.
*G06F 16/93* (2019.01)
*G06F 16/248* (2019.01)
*G06F 16/2457* (2019.01)

(56) References Cited

U.S. PATENT DOCUMENTS

| | | | |
|---|---|---|---|
| 5,724,567 A | 3/1998 | Rose et al. | |
| 5,754,939 A | 5/1998 | Herz et al. | |
| 5,848,396 A | 12/1998 | Gerace | |
| 6,006,218 A * | 12/1999 | Breese | G06F 17/30864 |
| 6,285,999 B1 | 9/2001 | Page et al. | |
| 6,327,590 B1 | 12/2001 | Chidlovskii et al. | |
| 6,385,619 B1 | 5/2002 | Eichstaedt et al. | |
| 6,584,468 B1 | 6/2003 | Gabriel et al. | |
| 6,647,381 B1 | 11/2003 | Li et al. | |
| 6,912,505 B2 | 6/2005 | Smith et al. | |
| 6,981,040 B1 * | 12/2005 | Konig | G06F 17/30867 |
| | | | 707/E17.109 |
| 9,298,777 B2 | 3/2016 | Lawrence | |
| 2001/0044720 A1 | 11/2001 | Lee et al. | |
| 2002/0024532 A1 | 2/2002 | Fables et al. | |
| 2002/0044571 A1 | 4/2002 | Penet et al. | |
| 2002/0157095 A1 * | 10/2002 | Masumitsu | H04H 40/18 |
| | | | 725/38 |
| 2002/0198882 A1 | 12/2002 | Linden et al. | |
| 2003/0033333 A1 | 2/2003 | Nishino et al. | |
| 2003/0233345 A1 | 12/2003 | Perisic et al. | |
| 2004/0044571 A1 | 3/2004 | Bronnimann et al. | |
| 2004/0267700 A1 * | 12/2004 | Dumais | G06F 17/30613 |

OTHER PUBLICATIONS

Notice of Allowance for U.S. Appl. No. 13/735,953, dated Nov. 16, 2015, 5 pages.

\* cited by examiner

Term-based Profile Table 300

| USER_ID | (TERM_1, WEIGHT_1) | (TERM_2, WEIGHT_2) | . . . | (TERM_N, WEIGHT_N) |
|---|---|---|---|---|
| . | . | . | . | . |
| . | . | . | . | . |
| . | . | . | . | . |
|  |  |  | . . . |  |

320 is USER_ID column; 340 spans the term/weight columns; 310 indicates rows.

Term-based Document Information Table 810

| DOC_ID | (TERM_1, WEIGHT_1) | (TERM_2, WEIGHT_2) | . . . | (TERM_X, WEIGHT_X) | Term-based Ranking Score |
|---|---|---|---|---|---|
| | | | | | |
| . . . | . . . | . . . | . . . | . . . | . . . |
| | | | . . . | | |

Category-based Document Information Table 830

| DOC_ID | (CATEGORY_1, WEIGHT_1) | (CATEGORY_2, WEIGHT_2) | . . . | (CATEGORY_Y, WEIGHT_Y) | Category-based Ranking Score |
|---|---|---|---|---|---|
| | | | | | |
| . . . | . . . | . . . | . . . | . . . | . . . |
| | | | . . . | | |

Link-based Document Information Table 850

| DOC_ID | (LINK_1, WEIGHT_1) | (LINK_2, WEIGHT_2) | . . . | (LINK_Z, WEIGHT_Z) | Link-based Ranking Score |
|---|---|---|---|---|---|
| | | | | | |
| . . . | . . . | . . . | . . . | . . . | . . . |
| | | | . . . | | |

Fig. 8

PERSONALIZATION OF WEB SEARCH RESULTS USING TERM, CATEGORY, AND LINK-BASED USER PROFILES

RELATED APPLICATIONS

This application is a continuation of U.S. patent application Ser. No. 13/735,953, filed Jan. 7, 2013, which is a continuation of U.S. patent application Ser. No. 13/295,019, filed Nov. 11, 2011, which is a continuation of U.S. patent application Ser. No. 12/778,869, filed May 12, 2010, entitled "Personalization of Web Search Results Using Term, Category, and Link-Based User Profiles," which is a continuation of U.S. patent application Ser. No. 10/676,711, filed Sep. 30, 2003, entitled "Personalization of Web Search," which applications are incorporated herein by reference in their entirety.

FIELD OF THE INVENTION

The present invention relates generally to the field of a search engine in a computer network system, in particular to a system and method of creating a user profile for a user of a search engine and using the user profile to customize search results in response to search queries submitted by the user.

BACKGROUND OF THE INVENTION

Search engines provide a powerful source of indexed documents from the Internet (or an intranet) that can be rapidly scanned in response to a search query submitted by a user. Such a query is usually very short (on average about two to three words). As the number of documents accessible via the Internet grows, the number of documents that match the query may also increase. However, not every document matching the query is equally important from the user's perspective. As a result, a user is easily overwhelmed by an enormous number of documents returned by a search engine, if the engine does not order the search results based on their relevance to the user's query.

One approach to improving the relevance of search results to a search query is to use the link structure of different web pages to compute global "importance" scores that can be used to influence the ranking of search results. This is sometimes referred to as the PageRank algorithm. A more detailed description of the PageRank algorithm can be found in the article "The Anatomy of a Large-Scale Hypertextual Search Engine" by S. Brin and L. Page, 7$^{th}$ International World Wide Web Conference, Brisbane, Australia and U.S. Pat. No. 6,285,999, both of which are hereby incorporated by reference as background information.

An important assumption in the PageRank algorithm is that there is a "random surfer" who starts his web surfing journey at a randomly picked web page and keeps clicking on the links embedded in the web pages, never hitting the "back" button. Eventually, when this random surfer gets bored of the journey, he may re-start a new journey by randomly picking another web page. The probability that the random surfer visits (i.e., views or downloads) a web page depends on the web page's page rank.

From an end user's perspective, a search engine using the PageRank algorithm treats a search query the same way no matter who submits the query, because the search engine does not ask the user to provide any information that can uniquely identify the user. The only factor that affects the search results is the search query itself, e.g., how many terms are in the query and in what order. The search results are a best fit for the interest of an abstract user, the "random surfer", and they are not be adjusted to fit a specific user's preferences or interests.

In reality, a user like the random surfer never exists. Every user has his own preferences when he submits a query to a search engine. The quality of the search results returned by the engine has to be evaluated by its users' satisfaction. When a user's preferences can be well defined by the query itself, or when the user's preference is similar to the random surfer's preference with respect to a specific query, the user is more likely to be satisfied with the search results. However, if the user's preference is significantly biased by some personal factors that are not clearly reflected in a search query itself, or if the user's preference is quite different from the random user's preference, the search results from the same search engine may be less useful to the user, if not useless.

As suggested above, the journey of the random surfer tends to be random and neutral, without any obvious inclination towards a particular direction. When a search engine returns only a handful of search results that match a query, the order of the returned results is less significant because the requesting user may be able to afford the time to browse each of them to discover the items most relevant to himself. However, with billions of web pages connected to the Internet, a search engine often returns hundreds or even thousands of documents that match a search query. In this case, the ordering of the search results is very important. A user who has a preference different from that of the random surfer may not find what he is looking for in the first five to ten documents listed in the search results. When that happens, the user is usually left with two options: (1) either spending the time required to review more of the listed documents so as to locate the relevant documents; or (2) refining the search query so as to reduce the number of documents that match the query. Query refinement is often a non-trivial task, sometimes requiring more knowledge of the subject or more expertise with search engines than the user possesses, and sometimes requiring more time and effort than the user is willing to expend.

For example, assume that a user submits to a search engine a search query having only one term "blackberry". Without any other context, on the top of a list of documents returned by a PageRank-based search engine may be a link to www.blackberry.net, because this web page has the highest page rank. However, if the query requester is a person with interests in foods and cooking, it would be more useful to order the search results so as to include at the top of the returned results web pages with recipes or other food related text, pictures or the like. It would be desirable to have a search engine that is able to reorder its search results, or to otherwise customize the search results, so as to emphasize web pages that are most likely to be of interest to the person submitting the search query. Further, it would be desirable for such a system to require minimal input from individual users, operating largely or completely without explicit input from the user with regard to the user's preferences and interests. Finally, it would be desirable for such a system to meet users' requirements with respect to security and privacy.

SUMMARY

A search engine utilizes user profiles to customize search results. A user profile comprises multiple items that characterize a user's search preference. These items are extracted from various information sources, including previous search queries submitted by the user, links from or to the documents identified by the previous queries, sampled content from the identified documents as well as personal information implicitly or explicitly provided by the user.

When the search engine receives a search query from a user, it first identifies a set of documents that match the search query. Each document is associated with a generic rank based on the document's page rank, the text associated with the document, and the search query. The search engine also identifies the user's profile and correlates the user profile with each of the identified documents. The correlation between a document and the user profile produces a profile rank for the document, indicating the relevance of the document to the user. The search engine then combines the document's generic rank and profile rank into a personalized rank. Finally, the documents are ordered according to their personalized ranks.

In one embodiment, a user profile may comprise a plurality of sub-profiles, each sub-profile characterizing the user's interest from a different perspective. A term-based profile comprises a plurality of terms, each term carrying a weight indicative of its importance relative to other terms. A category-based profile comprises multiple categories, optionally organized into a hierarchical map. The user's search preferences may be associated with at least a subset of the multiple categories, each category having an associated weight indicating the user's interest in the documents falling into this category. There may be multiple category-based profiles for a user. In some embodiments, the sub-profiles include a link-based profile, which includes a plurality of links that are, directly or indirectly, related to identified documents, each link having a weight indicating the importance of the link. Links in the link-based profile may be further organized with respect to different hosts and domains.

The present invention, including user profile construction and search results re-ordering and/or scoring, can be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 8 illustrates a plurality of exemplary data structures that may be used for storing information about documents after term-based, category-based and/or link-based analyses, respectively.

Like reference numerals refer to corresponding parts throughout the several views of the drawings.

DESCRIPTION OF EMBODIMENTS

The embodiments discussed below include systems and methods that create a user profile based a user's past experience with a search engine and then use the user profile to rank search results in response to search queries provided by the user.

Figure 1:
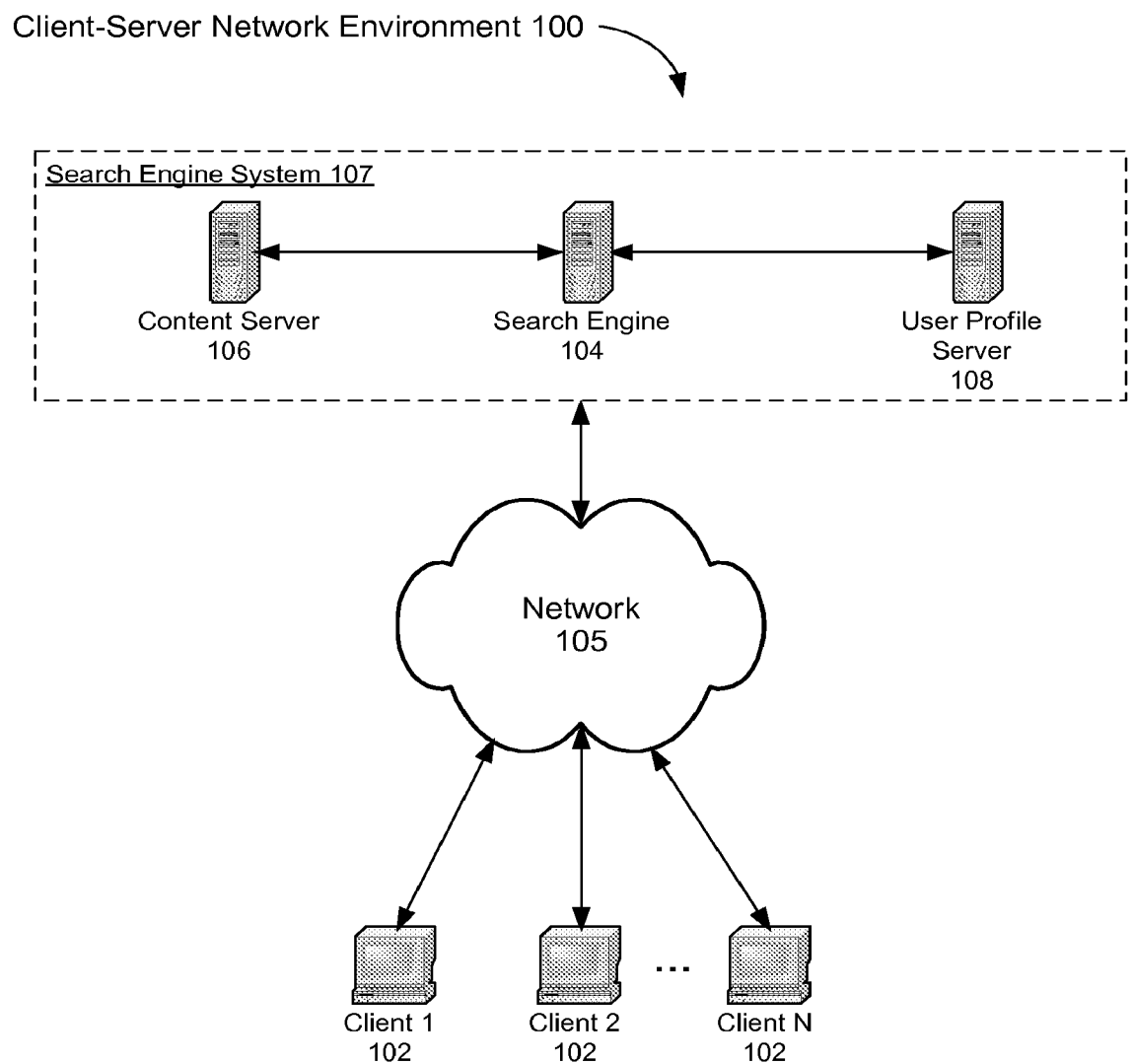
FIG. 1 illustrates a client-server network environment.

FIG. 1 provides an overview of a typical client-server network environment 100 in which the present invention may be implemented. A plurality of clients 102 are connected to a search engine system 107 through a network 105, e.g., the Internet. Search engine system 107 comprises one or more search engines 104. A search engine 104 is responsible for processing a search query submitted by a client 102, generating search results in accordance with the search query and returning the results to the client. Search engine system 107 may also comprise one or more content servers 106 and one or more user profile servers 108. A content server 106 stores a large number of indexed documents retrieved from different websites. Alternately, or in addition, the content server 106 stores an index of documents stored on various websites. In one embodiment, each indexed document is assigned a page rank according to the document's link structure. The page rank serves as a query independent measure of the document's importance. A search engine 104 communicates with one or more content servers 106 to select a plurality of documents in response to a specific search query. The search engine assigns a score to each document based on the document's page rank, the text associated with the document, and the search query.

A user profile server 108 stores a plurality of user profiles. Each profile includes information that uniquely identifies a user as well as his previous search experience and personal information, which can be used to refine search results in response to the search queries submitted by this user. Different approaches are available for user profile construction. For example, a user profile can be created by requiring a first-time user to fill in a form or answer a survey. This approach may be useful in certain applications such as opening a bank account. But it is hardly a favorable one in the context of a search engine. First, a user's interaction with a search engine is usually a dynamic process. As time goes on, the user's interests may change. This change may be reflected by the search queries submitted by the user, or by the user's handling of the search results, or both. The user's answers to questions on a form tend to become less useful over time, unless the user chooses to update his answers periodically. Unlike an occasional update of phone number in the case of an on-line bank account, frequent updates of a user profile in the case of a search engine significantly affect its user friendliness, which is an important consideration when a user chooses among the search engines currently available. Further, it is known that users are reluctant to provide explicit feedback, such as filling out of a form, as many users find it too burdensome. Thus, while some users may provide explicit feedback on their interests, it is desirable to have a procedure for implicitly obtaining information about the user's interests without requiring any explicit or new actions by the user.

Figure 2:
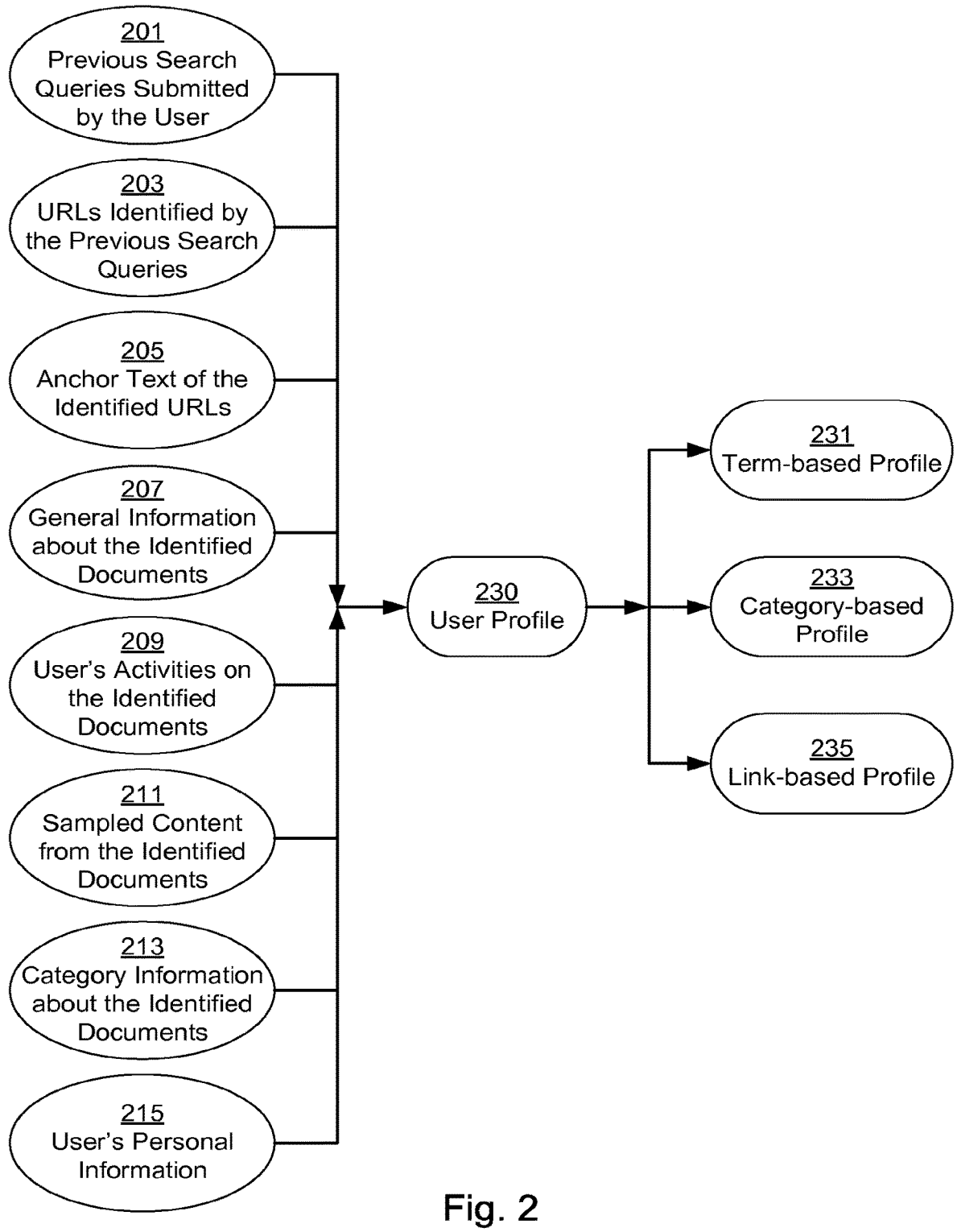
FIG. 2 illustrates multiple sources of user information and their relationship to a user profile.

It has been observed that a search engine user's past search activities provide useful hints about the user's personal search preferences. FIG. 2 provides a list of sources of user information that are beneficial for user profile construction. For example, previously submitted search queries 201 are very helpful in profiling a user's interests. If a user has submitted multiple search queries related to diabetes, it is more likely than not that this is a topic of interest to the user. If the user subsequently submits a query including the term "organic food", it can be reasonably inferred that he may be more interested in those organic foods that are helpful in fighting diabetes. Similarly, the universal resource locators (URL) 203 associated with the search results in response to the previous search queries and their corresponding anchor texts 205, especially for search result items that have been selected or "visited" by the user (e.g., downloaded or otherwise viewed by the user), are helpful in determining the user's preferences. When a first page contains a link to a second page, and the link has text associated with it (e.g., text neighboring the link), the text associated with the link is called "anchor text" with respect to the second page. Anchor text establishes a relationship between the text associated with a URL link in a document and another document to which the URL link points. The advantages of anchor text include that it often provides an accurate description of the document to which the URL link points, and it can be used to index documents that cannot be indexed by a text-based search engine, such as images or databases.

After receiving search results, the user may click on some of the URL links, thereby downloading the documents referenced by those links, so as to learn more details about those documents. Certain types of general information 207 can be associated with a set of user selected or user identified documents. For purposes of forming a user profile, the identified documents from which information is derived for inclusion in the user profile may include: documents identified by search results from the search engine, documents accessed (e.g., viewed or downloaded, for example using a browser application) by the user (including documents not identified in prior search results), documents linked to the documents identified by search results from the search engine, and documents linked to the documents accessed by the user, or any subset of such documents.

The general information 207 about the identified documents may answer questions such as, what is the format of the document? Is it in hypertext markup language (HTML), plain text, portable document format (PDF), or Microsoft Word? What is the topic of the document? Is it about science, health or business? This information is also helpful in profiling the user's interests. In addition, information about a user's activities 209 with respect to the user selected documents (sometimes herein call the identified documents), such as how long the user spent viewing the document, the amount of scrolling activity on the document, and whether the user has printed, saved or bookmarked the document, also suggests the importance of the document to the user as well as the user's preferences. In some embodiments, information about user activities 209 is used both when weighting the importance of information extracted or derived from the user identified documents. In some embodiments, information about user activities 209 is used to determine which of the user identified documents to use as the basis for deriving the user profile. For example, information 209 may be used to select only documents that received significant user activity (in accordance with predefined criteria) for generating the user profile, or information 209 may be used to exclude from the profiling process documents that the user viewed for less than a predefined threshold amount of time.

Finally, the content of the identified documents from previous search activities is a rich source of information about a user's interests and preferences. Key terms appearing in the identified documents and their frequencies with which they appear in the identified documents are not only useful for indexing the document, but are also a strong indication of the user's personal interests, especially when they are combined with other types of user information discussed above. In one embodiment, instead of the whole documents, sampled content 211 from the identified documents is extracted for the purpose of user profile construction, to save storage space and computational cost. In another embodiment, various information related to the identified documents may be classified to constitute category information 213 about the identified documents. More discussion about content sampling, the process of identifying key terms in an identified document and the usage of the category information is provided below.

Optionally, a user may choose to offer personal information 215, including demographic and geographic information associated with the user, such as the user's age or age range, educational level or range, income level or range, language preferences, marital status, geographic location (e.g., the city, state and country in which the user resides, and possibly also including additional information such as street address, zip code, and telephone area code), cultural background or preferences, or any subset of these. Compared with other types of personal information such as a user's favorite sports or movies that are often time varying, this personal information is more static and more difficult to infer from the user's search queries and search results, but may be crucial in correctly interpreting certain queries submitted by the user. For example, if a user submits a query containing "Japanese restaurant", it is very likely that he may be searching for a local Japanese restaurant for dinner. Without knowing the user's geographical location, it is hard to order the search results so as to bring to the top those items that are most relevant to the user's true intention. In certain cases, however, it is possible to infer this information. For example, users often select results associated with a specific region corresponding to where they live.

Creating a user profile 230 from the various sources of user information is a dynamic and complex process. In some embodiments, the process is divided into sub-processes. Each sub-process produces one type of user profile characterizing a user's interests or preferences from a particular perspective. They are:

a term-based profile 231—this profile represents a user's search preferences with a plurality of terms, where each term is given a weight indicating the importance of the term to the user;

a category-based profile 233—this profile correlates a user's search preferences with a set of categories, which may be organized in a hierarchal fashion, with each category being given a weight indicating the extent of correlation between the user's search preferences and the category; and a link-based profile 235—this profile identifies a plurality of links that are directly or indirectly related to the user's search preferences, with each link being given a weight indicating the relevance between the user's search preferences and the link.

In some embodiments, the user profile 230 includes only a subset of these profiles 231, 233, 235, for example just one or two of these profiles. In one embodiment, the user profile 230 includes a term-based profile 231 and a category-based profile 233, but not a link-based profile 235.

In one embodiment, a user profile is created and stored on a server (e.g., user profile server 108) associated with a search engine. The advantage of such deployment is that the user profile can be easily accessed by multiple computers, and that since the profile is stored on a server associated with (or part of) the search engine 104, it can be easily used by the search engine 104 to personalize the search results. In another embodiment, the user profile can be created and stored on the user's computer, sometimes called the client in a network environment. Creating and storing a user profile on a user's computer not only reduces the computational and storage cost for the search engine's servers, but also satisfies some users' privacy requirements. In yet another embodiment, the user profile may be created and updated on the client, but stored on a search engine server. Such embodiment combines some of the benefits illustrated in the other two embodiments. A disadvantage of this arrangement is that it may increase the network traffic between clients and the search engine servers. It is understood by a person of ordinary skill in the art that the user profiles of the present invention can be implemented using client computers, server computers, or both.

Figures 3, 5:
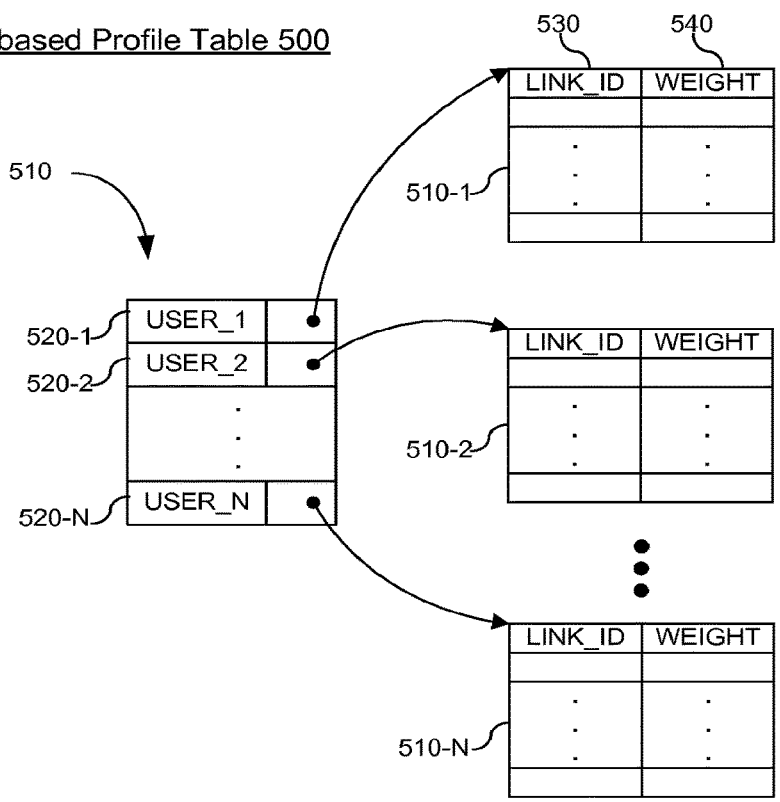
FIG. 3 is an exemplary data structure that may be used for storing term-based profiles for a plurality of users.
FIG. 5 is an exemplary data structure that may be used for storing link-based profiles for a plurality of users.

FIG. 3 illustrates an exemplary data structure, a term-based profile table 300, that may be used for storing term-based profiles for a plurality of users. Table 300 includes a plurality of records 310, each record corresponding to a user's term-based profile. A term-based profile record 310 includes a plurality of columns including a USER_ID column 320 and multiple columns of (TERM, WEIGHT) pairs 340. The USER_ID column stores a value that uniquely identifies a user or a group of users sharing the same set of (TERM, WEIGHT) pairs, and each (TERM, WEIGHT) pair 340 includes a term, typically 1-3 words long, that is usually important to the user or the group of users and a weight associated with the term that quantifies the importance of the term. In one embodiment, the term may be represented as one or more n-grams. An n-gram is defined as a sequence of n tokens, where the tokens may be words. For example, the phrase "search engine" is an n-gram of length 2, and the word "search" is an n-gram of length 1.

N-grams can be used to represent textual objects as vectors. This makes it possible to apply geometric, statistical and other mathematical techniques, which are well defined for vectors, but not for objects in general. In the present invention, n-grams can be used to define a similarity measure between two terms based on the application of a mathematical function to the vector representations of the terms.

The weight of a term is not necessarily a positive value. If a term has a negative weight, it may suggest that the user prefers that his search results should not include this term and the magnitude of the negative weight indicates the strength of the user's preference for avoiding this term in the search results. By way of example, for a group of surfing fans at Santa Cruz, Calif., the term-based profile may include terms like "surfing club", "surfing event" and "Santa Cruz" with positive weights. The terms like "Internet surfing" or "web surfing" may also be included in the profile. However, these terms are more likely to receive a negative weight since they are irrelevant and confusing with the authentic preference of the users sharing this term-based profile.

A term-based profile itemizes a user's preference using specific terms, each term having certain weight. If a document matches a term in a user's term-based profile, i.e., its content includes exactly this term, the term's weight will be assigned to the document; however, if a document does not match a term exactly, it will not receive any weight associated with this term. Such a requirement of relevance between a document and a user profile sometimes may be less flexible when dealing with various scenarios in which a fuzzy relevance between a user's preference and a document exists. For example, if a user's term-based profile includes terms like "Mozilla" and "browser", a document containing no such terms, but other terms like "Galeon" or "Opera" will not receive any weight because they do not match any existing term in the profile, even though they are actually Internet browsers. To address the need for matching a user's interests without exact term matching, a user's profile may include a category-based profile.

Figure 4A:
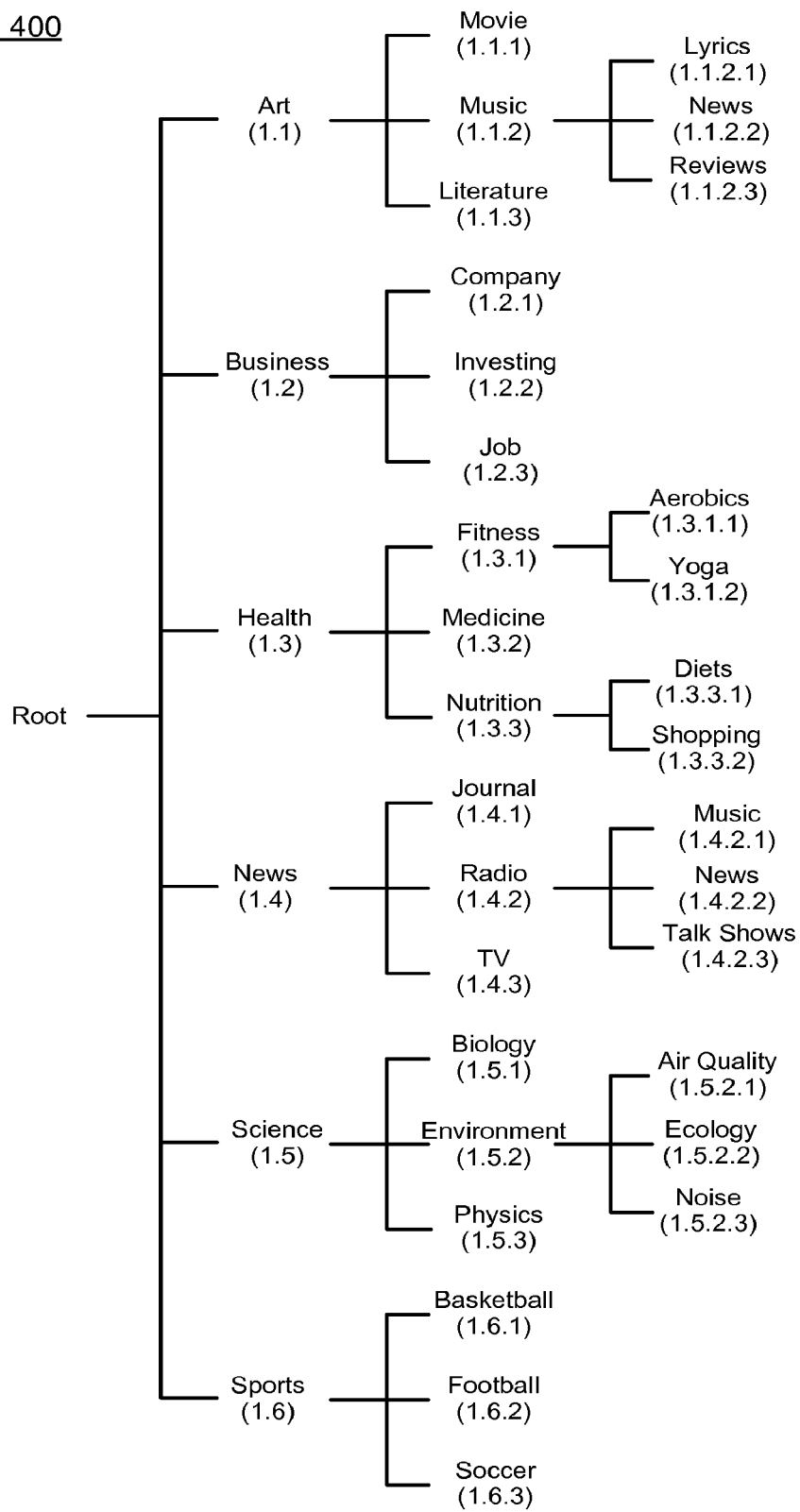
FIG. 4A is an exemplary category map that may be used for classifying a user's past search experience.

FIG. 4A illustrates a hierarchal category map 400 according to the Open Directory Project (http://dmoz.org/). Starting from the root level of map 400, documents are organized under several major topics, such as "Art", "News", "Sports", etc. These major topics are often too broad to delineate a user's specific interest. Therefore, they are further divided into sub-topics that are more specific. For example, topic "Art" may comprise sub-topics like "Movie", "Music" and "Literature" and the sub-topic "Music" may further comprise sub-sub-topics like "Lyrics", "News" and "Reviews". Note that each topic is associated with a unique CATEGORY_ID like 1.1 for "Art", 1.4.2.3 for "Talk Show" and 1.6.1 for "Basketball".

Figure 4B:
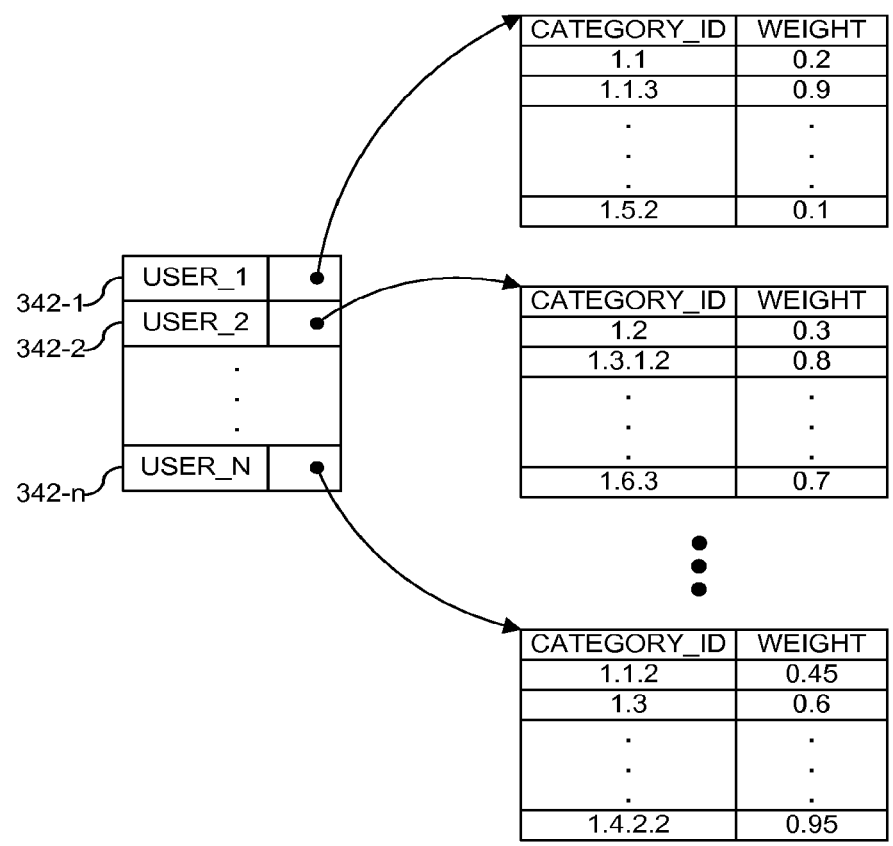
FIG. 4B is an exemplary data structure that may be used for storing category-based profiles for a plurality of users.

A user's specific interests may be associated with multiple categories at various levels, each of which may have a weight indicating the degree of relevance between the category and the user's interest. In one embodiment, a category-based profile may be implemented using a Hash table data structure as shown in FIG. 4B. A category-based profile table 450 includes a table that comprises a plurality of records 341-1, 342-2, . . . 342-n, each record including a USER_ID and a pointer pointing to another data structure, such as a table, e.g., one of the tables shown on the right side of FIG. 4B. This table may include two columns, a CATEGORY_ID column and a WEIGHT column. The CATEGORY_ID column contains a category's identification number as shown in FIG. 4A, suggesting that this category is relevant to the user's interests and the value in the WEIGHT column indicates the degree of relevance of the category to the user's interests.

A user profile based upon the category map 400 is a topic-oriented implementation. The items in a category-based profile can also be organized in other ways. In one embodiment, a user's preference can be categorized based on the formats of the documents identified by the user, such as HTML, plain text, PDF, Microsoft Word, etc. Different formats may have different weights. In another embodiment, a user's preference can be categorized according to the types of the identified documents, e.g., an organization's homepage, a person's homepage, a research paper, or a news group posting, each type having an associated weight. Another type category that can be used to characterize a user's search preferences is document origin, for instance the country associated with each document's host. In yet another embodiment, the above-identified category-based profiles may co-exist, with each one reflecting one aspect of a user's preferences.

Besides term-based and category-based profiles, another type of user profile is referred to as a link-based profile. As discussed above, the PageRank algorithm is based on the link structure that connects various documents over the Internet. A document that has more links pointing to it is often assigned a higher page rank and therefore attracts more attention from a search engine. Link information related to a document identified by a user can also be used to infer the user's preferences. In one embodiment, a list of preferred URLs are identified for a user by analyzing the frequency of his access to those URLs. Each preferred URL may be further weighted according to the time spent by the user and the user's scrolling activity at the URL, and/or other user activities (209, FIG. 2) when visiting the document at the URL. In another embodiment, a list of preferred hosts are identified for a user by analyzing the user's frequency of accessing web pages of different hosts. When two preferred URLs are related to the same host the weights of the two URLs may be combined to determine a weight for the host. In another embodiment, a list of preferred domains are identified for a user by analyzing the user's frequency of accessing web pages of different domains. For example, for finance.yahoo.com, the host is "finance.yahoo.com" while the domain is "yahoo.com".

FIG. 5 illustrates a link-based profile using a Hash table data structure. A link-based profile table 500 includes a table 510 that includes a plurality of records 520, each record including a USER_ID and a pointer pointing to another data structure, such as table 510-1. Table 510-1 may include two columns, LINK_ID column 530 and WEIGHT column 540. The identification number stored in the LINK_ID column 530 may be associated with a preferred URL or host. The actual URL/host/domain may be stored in the table instead of the LINK_ID, however it is preferable to store the LINK_ID to save storage space.

A preferred list of URLs and/or hosts includes URLs and/or hosts that have been directly identified by the user. The preferred list of URLs and/or host may furthermore extend to URLs and/or hosts indirectly identified by using methods such as collaborative filtering or bibliometric analysis, which are known to persons of ordinary skill in the art. In one embodiment, the indirectly identified URLs and/or host include URLs or hosts that have links to/from the directly identified URLs and/or hosts. These indirectly identified URLs and/or hosts are weighted by the distance between them and the associated URLs or hosts that are directly identified by the user. For example, when a directly identified URL or host has a weight of 1, URLs or hosts that are one link away may have a weight of 0.5, URLs or hosts that are two links away may have a weight of 0.25, etc. This procedure can be further refined by reducing the weight of links that are not related to the topic of the original URL or host, e.g., links to copyright pages or web browser software that can be used to view the documents associated with the user selected URL or host. Irrelevant Links can be identified based on their context or their distribution. For example, copyright links often use specific terms (e.g., copyright or "All rights reserved" are commonly used terms in the anchor text of a copyright link); and links to a website from many unrelated websites may suggest that this website is not topically related (e.g., links to the Internet Explorer website are often included in unrelated websites). The indirect links can also be classified according to a set of topics and links with very different topics may be excluded or be assigned a low weight.

The three types of user profiles discussed above are generally complementary to one another since different profiles delineate a user's interests and preferences from different vantage points. However, this does not mean that one type of user profile, e.g., category-based profile, is incapable of playing a role that is typically played by another type of user profile. By way of example, a preferred URL or host in a link-based profile is often associated with a specific topic, e.g., finance.yahoo.com is a URL focusing on financial news. Therefore, what is achieved by a link-based profile that comprises a list of preferred URLs or hosts to characterize a user's preference may also be achievable, at least in part, by a category-based profile that has a set of categories that cover the same topics covered by preferred URLs or hosts.

It is a non-trivial operation to construct various types of user profiles that can be stored in the data structures shown in FIGS. 3-5 based on the user information listed in FIG. 2. Given a document identified (e.g., viewed) by a user, different terms in the document may have different importance in revealing the topic of the document. Some terms, e.g., the document's title, may be extremely important, while other terms may have little importance. For example, many documents contain navigational links, copyright statements, disclaimers and other text that may not be related to the topic of the document. How to efficiently select appropriate documents, content from those documents and terms from within the content is a challenging topic in computational linguistics. Additionally, it is preferred to minimize the volume of user information processed, so as to make the process of user profile construction computationally efficient. Skipping less important terms in a document helps in accurately matching a document with a user's interest.

Paragraph sampling (described below with reference to FIG. 6) is a procedure for automatically extracting content from a document that may be relevant to a user. An important observation behind this procedure is that less relevant content in a document, such as navigational links, copyright statements, disclaimer, etc., tend to be relatively short segments of text. In one embodiment, paragraph sampling looks for the paragraphs of greatest length in a document, processing the paragraphs in order of decreasing length until the length of a paragraph is below a predefined threshold. The paragraph sampling procedure optionally selects up to a certain maximum amount of content from each processed paragraph. If few paragraphs of suitable length are found in a document, the procedure falls back to extracting text from other parts of the document, such as anchor text and ALT tags.

Figure 6:
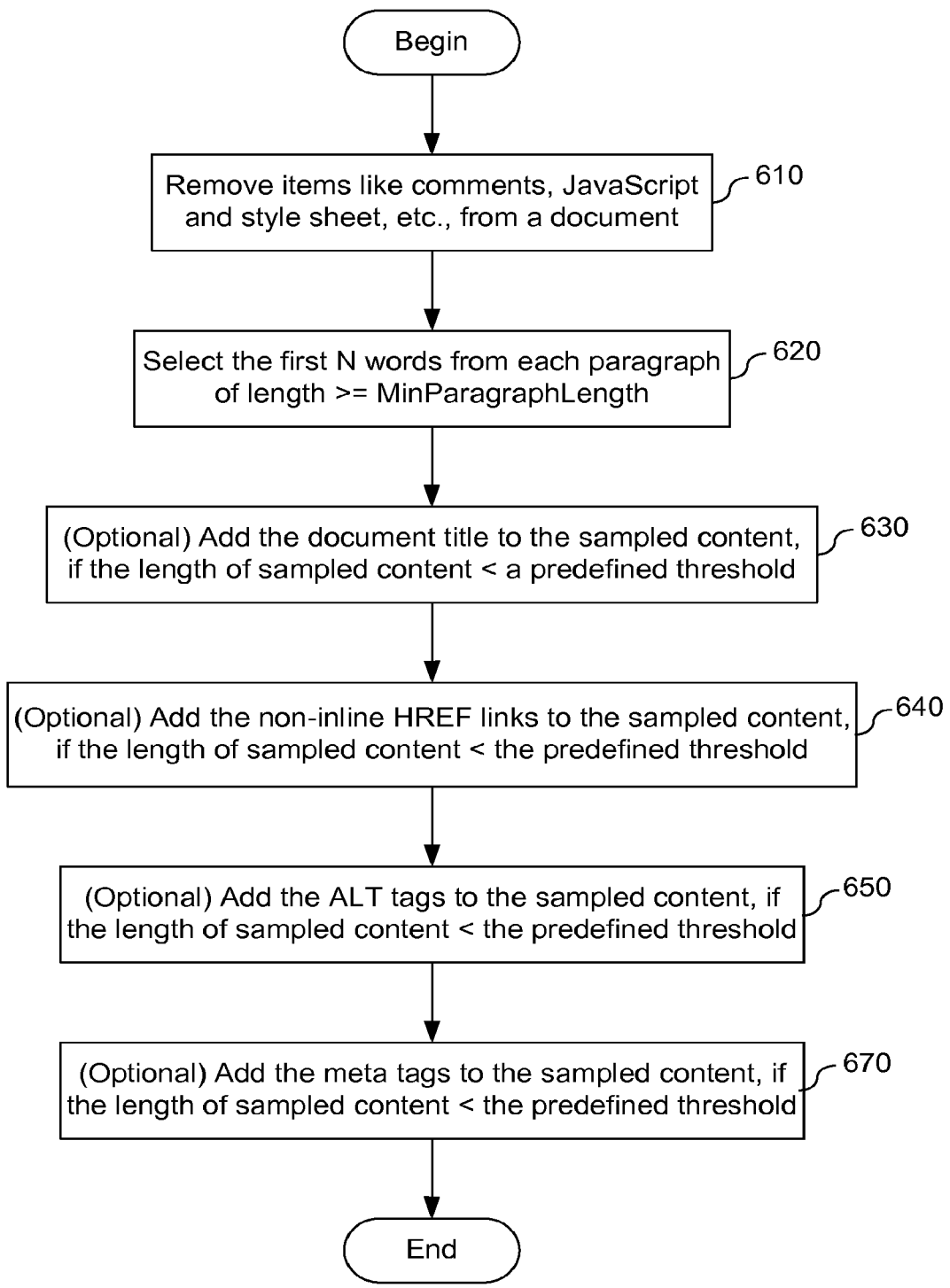
FIG. 6 is a flowchart illustrating paragraph sampling.

FIG. 6 is a flowchart illustrating the major steps of paragraph sampling. Paragraph sampling begins with the step 610 of removing predefined items, such as comments, JavaScript and style sheets, etc., from a document. These items are removed because they are usually related to visual aspects of the document when rendered on a browser and are unlikely to be relevant to the document's topic. Following that, the procedure may select the first N words (or M sentences) at step 620 from each paragraph whose length is greater than a threshold value, MinParagraphLength, as sampled content. In one embodiment, the values of N and M are chosen to be 100 and 5, respectively. Other values may be used in other embodiments.

In order to reduce the computational and storage load associated with the paragraph sampling procedure, the procedure may impose a maximum limit, e.g., 1000 words, on the sampled content from each document. In one embodiment, the paragraph sampling procedure first organizes all the paragraphs in a document in length decreasing order, and then starts the sampling process with a paragraph of maximum length. It is noted that the beginning and end of a paragraph depend on the appearance of the paragraph in a browser, not on the presence of an uninterrupted text string in the HTML representation of the paragraph. For this reason, certain HTML commands, such as commands for inline links and for bold text, are ignored when determining paragraph boundaries. In some embodiments, the paragraph sampling procedure screens the first N words (or M sentences) so as to filter out those sentences including boilerplate terms like "Terms of Service" or "Best viewed", because such sentences are usually deemed irrelevant to the document's topic.

Before sampling a paragraph whose length is above the threshold value, the procedure may stop sampling content from the document if the number of words in the sampled content has reached the maximum word limit. If the maximum word limit has not been reached after processing all paragraphs of length greater than the threshold, optional steps 630, 640, 650 and 670 are performed. In particular, the procedure adds the document title (630), the non-inline HREF links (640), the ALT tags (650) and the meta tags (670) to the sampled content until it reaches the maximum word limit.

Once the documents identified by a user have been scanned, the sampled content can be used for identifying a list of most important (or unimportant) terms through context analysis. Context analysis attempts to learn context terms that predict the most important (or unimportant) terms in a set of identified documents. Specifically, it looks for prefix patterns, postfix patterns, and a combination of both. For example, an expression "x's home page" may identify the term "x" as an important term for a user and therefore the postfix pattern "* home page" can be used to predict the location of an important term in a document, where the asterisk "*" represents any term that fits this postfix pattern. In general, the patterns identified by context analysis usually consist of m terms before an important (or unimportant) term and n terms after the important (or unimportant) term, where both m and n are greater than or equal to 0 and at least one of them is greater than 0. Typically, m and n are less than 5, and when non-zero are preferably between 1 and 3. Depending on its appearance frequency, a pattern may have an associated weight that indicates how important (or unimportant) the term recognized by the pattern is expected to be.

Figure 7A:
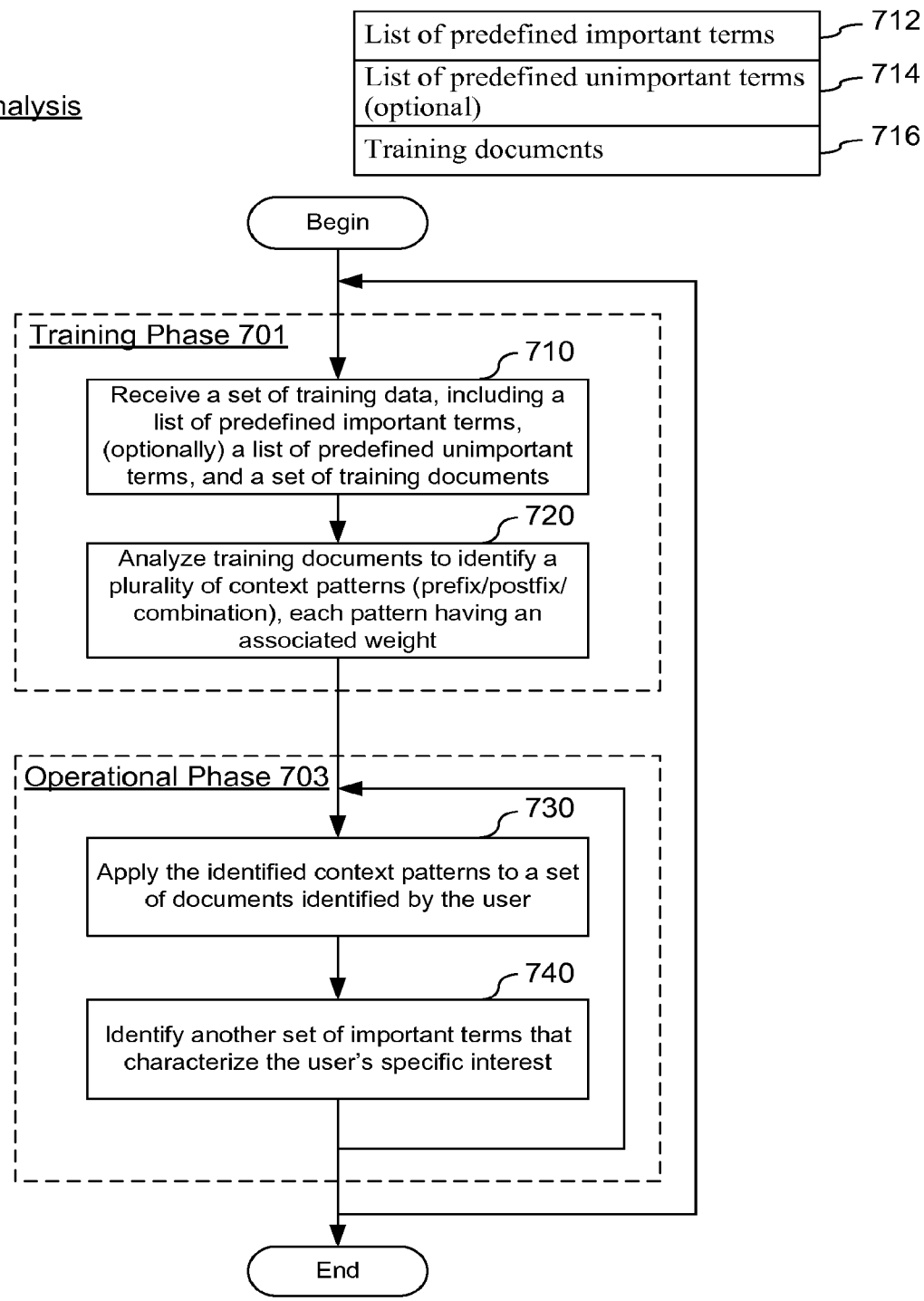
FIG. 7A is a flowchart illustrating context analysis.

According to one embodiment of the present invention (FIG. 7A), context analysis has two distinct phases, a training phase 701 and an operational phase 703. The training phase 701 receives and utilizes a list of predefined important terms 712, an optional list of predefined unimportant terms 714, and a set of training documents (step 710). In some embodiments, the list of predefined unimportant terms is not used. The source of the lists 712, 714 is not critical. In some embodiments, these lists 712, 714 are generated by extracting words or terms from a set of documents (e.g., a set of several thousand web pages of high page rank) in accordance with a set of rules, and then editing them to remove terms that in the opinion of the editor do not belong in the lists. The source of the training documents is also not critical. In some embodiments, the training documents comprise a randomly or pseudo-randomly selected set of documents already known to the search engine. In other embodiments, the training documents are selected from a database of documents in the search engine in accordance with predefined criteria.

During the training phase 701, the training documents are processed (step 720), using the lists of predefined important and unimportant terms, so as to identify a plurality of context patterns (e.g., prefix patterns, postfix patterns, and prefix-postfix patterns) and to associate a weight with each identified context pattern. During the operational phase 703, the context patterns are applied to documents identified by the user (step 730) to identify a set of important terms (step 740) that characterize the user's specific interests and preferences. Learning and delineating a user's interests and preferences is usually an ongoing process. Therefore, the operational phase 703 may be repeated to update the set of important terms that have been captured previously. This may be done each time a user accesses a document, according to a predetermined schedule, at times determined in accordance with specified criteria, or otherwise from time to time. Similarly, the training phase 701 may also be repeated to discover new sets of context patterns and to recalibrate the weights associated with the identified context patterns.

Below is a segment of pseudo code that exemplifies the training phase:

```
For each document in the set {
    For each important term in the document {
        For m = 0 to MaxPrefix {
            For n = 0 to MaxPostfix {
                Extract the m words before the important
                term and the n words after the important
                term as s;
                Add 1 to ImportantContext(m,n,s);
            }
        }
    }
    For each unimportant term in the document {
        For m = 0 to MaxPrefix {
            For n = 0 to MaxPostfix {
                Extract the m words before the
                unimportant term and the n words after
                the unimportant term as s;
                Add 1 to UnimportantContext(m,n,s);
            }
        }
    }
}
For m = 0 to MaxPrefix {
    For n = 0 to MaxPostfix {
        For each value of s {
            Set the weight for s to a function of
            ImportantContext(m,n,s), and
            UnimportantContext(m,n,s);
        }
    }
}
```

In the pseudo code above, the expression s refers to a prefix pattern (m=0), a postfix pattern (n=0) or a combination of both (m>0 & n>0). Each occurrence of a specific pattern is registered at one of the two multi-dimensional arrays, ImportantContext(m,n,s) or UnimportantContext(m,n,s). The weight of a prefix, postfix or combination pattern is set higher if this pattern identifies more important terms and fewer unimportant terms and vice versa. Note that it is possible that a same pattern may be associated with both important and unimportant terms. For example, the postfix expression "* operating system" may be used in the training documents 716 in conjunction with terms in the list of predefined important terms 712 and also used in conjunction with terms in the list of predefined unimportant terms 714. In this situation, the weight associated with the postfix pattern "* operating system" (represented by the expression Weight(1,0,"operating system")) will take into account the number of times the postfix expression is used in conjunction with terms in the list of predefined important terms as well as the number of times the postfix expression is used in conjunction with terms in the list of predefined unimportant terms. One possible formula to determine the weight of a context pattern s is:

Weight(*m,n,s*)=Log(ImportantContext(*m,n,s*)+1)−Log(UnimportantContext(*m,n,s*)+1).

Other weight determination formulas may be used in other embodiments.

Figure 7B:
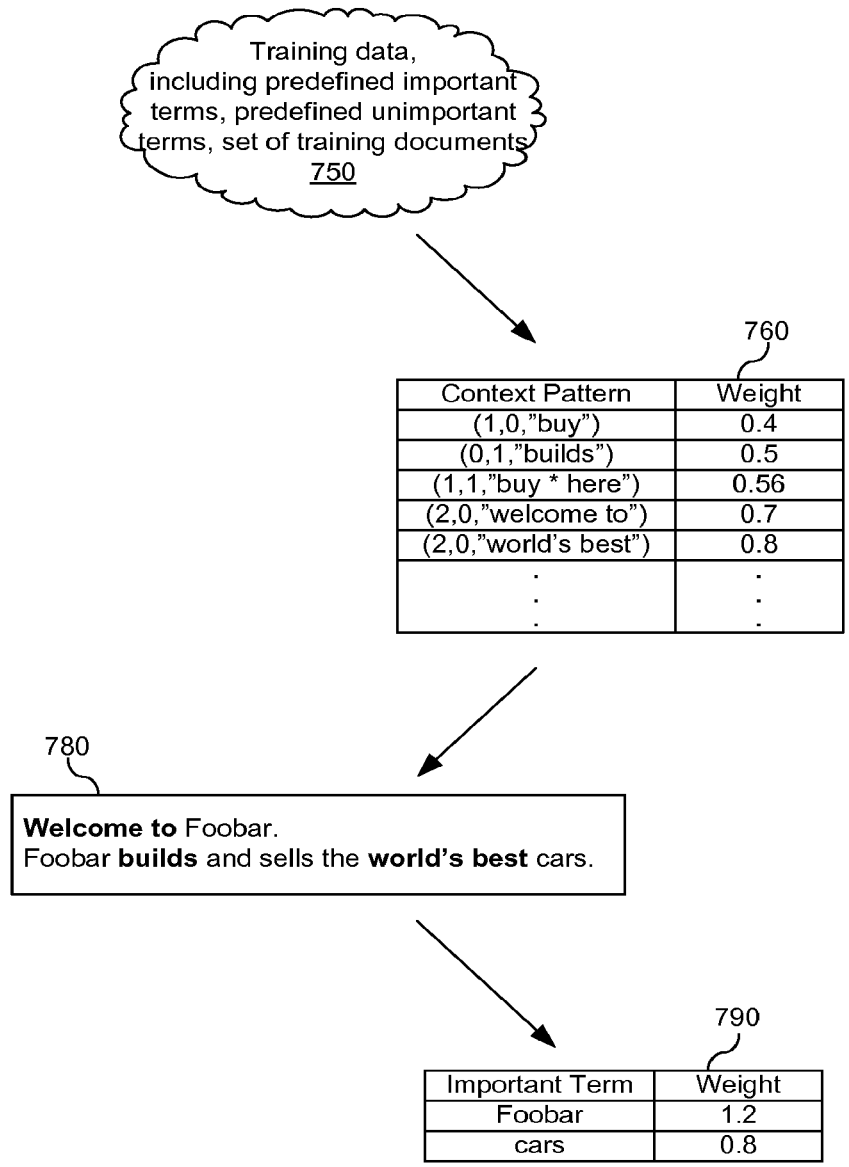
FIG. 7B depicts a process of identifying important terms using context analysis.

In the second phase of the context analysis process, the weighted context patterns are used to identify important terms in one or more documents identified by the user. Referring to FIG. 7B, in the first phase a computer system receives training data 750 and creates a set of context patterns 760, each context pattern having an associated weight. The computer system then applies the set of context patterns 760 to a document 780. In FIG. 7B, previously identified context patterns found within the document 780 are highlighted. Terms 790 associated with the context patterns are identified and each such term receives a weight based on the weights associated with the context patterns. For example, the term "Foobar" appears in the document twice, in association with two different patterns, the prefix pattern "Welcome to *" and the postfix pattern "* builds", and the weight 1.2 assigned to "Foobar" is the sum of the two patterns' weights, 0.7 and 0.5. The other identified term "cars" has a weight of 0.8 because the matching prefix pattern "world's best *" has a weight of 0.8. In some embodiments the weight for each term is computed using a log transform, where the final weight is equal to log(initial weight+1). It is possible that the two terms "Foobar" and "cars" may not be in the training data 750 and may have never been encountered by the user before. Nevertheless, the context analysis method described above identifies these terms and adds them to the user's term-based profile. Thus, context analysis can be used to discover terms associated with a user's interests and preferences even when those terms are not included in a predefined database of terms.

As noted, the output of context analysis can be used directly in constructing a user's term-based profile. Additionally, it may be useful in building other types of user profiles, such as a user's category-based profile. For example, a set of weighted terms can be analyzed and classified into a plurality of categories covering different topics, and those categories can be added to a user's category-based profile.

After executing the context analysis on a set of documents identified by or for a user, the resulting set of terms and weights may occupy a larger amount of storage than allocated for each user's term-based profile. Also, the set of terms and corresponding weights may include some terms with weights much, much smaller than other terms within the set. Therefore, in some embodiments, at the conclusion of the context analysis, the set of terms and weights is pruned by removing terms having the lowest weights (A) so that the total amount of storage occupied by the term-based profile meets predefined limits, and/or (B) so as to remove terms whose weights are so low, or terms that correspond to older items, as defined by predefined criteria, that the terms are deemed to be not indicative of the user's search preferences and interests. In some embodiments, similar pruning criteria and techniques are also applied to the category-based profile and/or the link-based profile.

In some embodiments, a user's profile is updated each time the user performs a search and selects at least one document from the search results to download or view. In some embodiments, the search engine builds a list of documents identified by the user (e.g., by selecting the documents from search results) over time, and at predefined times (e.g., when the list reaches a predefined length, or a predefined amount of time has elapsed), performs a profile update.

When performing an update, new profile data is generated, and the new profile data is merged with the previously generated profile data for the user. In some embodiments, the new profile data is assigned higher importance than the previously generated profile data, thereby enabling the system to quickly adjust a user's profile in accordance with changes in the user's search preferences and interests. For example, the weights of items in the previously generated profile data may be automatically scaled downward prior to merging with the new profile data. In one embodiment, there is a date associated with each item in the profile, and the information in the profile is weighted based on its age, with older items receiving a lower weight than when they were new. In other embodiments, the new profile data is not assigned high importance than the previously generated profile data.

The paragraph sampling and context analysis methods may be used independently or in combination. When used in combination, the output of the paragraph sampling is used as input to the context analysis method.

It is further noted that the above-described methods used for creating user profiles, e.g., paragraph sampling and context analysis, may be also leveraged for determining the relevance of a candidate document to a user's preference. Indeed, the primary mission of a search engine is to identify a series of documents that are most relevant to a user's preference based on the search queries submitted by the user as well as the user's user profile. FIG. 8 illustrates several exemplary data structures that can be used to store information about a document's relevance to a user profile from multiple perspectives. For each candidate document, each identified by a respective DOC_ID, term-based document information table 810 includes multiple pairs of terms and their weights, category-based document information table 830 includes a plurality of categories and associated weights, and link-based document information table 850 includes a set of links and corresponding weights.

The rightmost column of each of the three tables (810, 830 and 850) stores the rank (i.e., a computed score) of a document when the document is evaluated using one specific type of user profile. A user profile rank can be determined by combining the weights of the items associated with a document. For instance, a category-based or topic-based profile rank may be computed as follows. A user may prefer documents about science with a weight of 0.6, while he dislikes documents about business with a weight of −0.2. Thus, when a science document matches a search query, it will be weighted higher than a business document. In general, the document topic classification may not be exclusive. A candidate document may be classified as being a science document with probability of 0.8 and a business document with probability of 0.4. A link-based profile rank may be computed based on the relative weights allocated to a user's URL, host, domain, etc., preferences in the link-based profile. In one embodiment, term-based profile rank can be determined using known techniques, such as the term frequency-inverse document frequency (TF-IDF). The term frequency of a term is a function of the number of times the term appears in a document. The inverse document frequency is an inverse function of the number of documents in which the term appears within a collection of documents. For example, very common terms like "the" occur in many documents and consequently as assigned a relatively low inverse document frequency.

When a search engine generates search results in response to a search query, a candidate document D that satisfies the query is assigned a query score, QueryScore, in accordance with the search query. This query score is then modulated by document D's page rank, PageRank, to generate a generic score, GenericScore, that is expressed as GenericScore=QueryScore*PageRank.

This generic score may not appropriately reflect document D's importance to a particular user U if the user's interests or preferences are dramatically different from that of the random surfer. The relevance of document D to user U can be accurately characterized by a set of profile ranks, based on the correlation between document D's content and user U's term-based profile, herein called the TermScore, the correlation between one or more categories associated with document D and user U's category-based profile, herein called the CategoryScore, and the correlation between the URL and/or host of document D and user U's link-based profile, herein called the LinkScore. Therefore, document D may be assigned a personalized rank that is a function of both the document's generic score and the user profile scores. In one embodiment, this personalized score can be expressed as:

PersonalizedScore=GenericScore*(TermScore+CategoryScore+LinkScore).

Figure 9A:
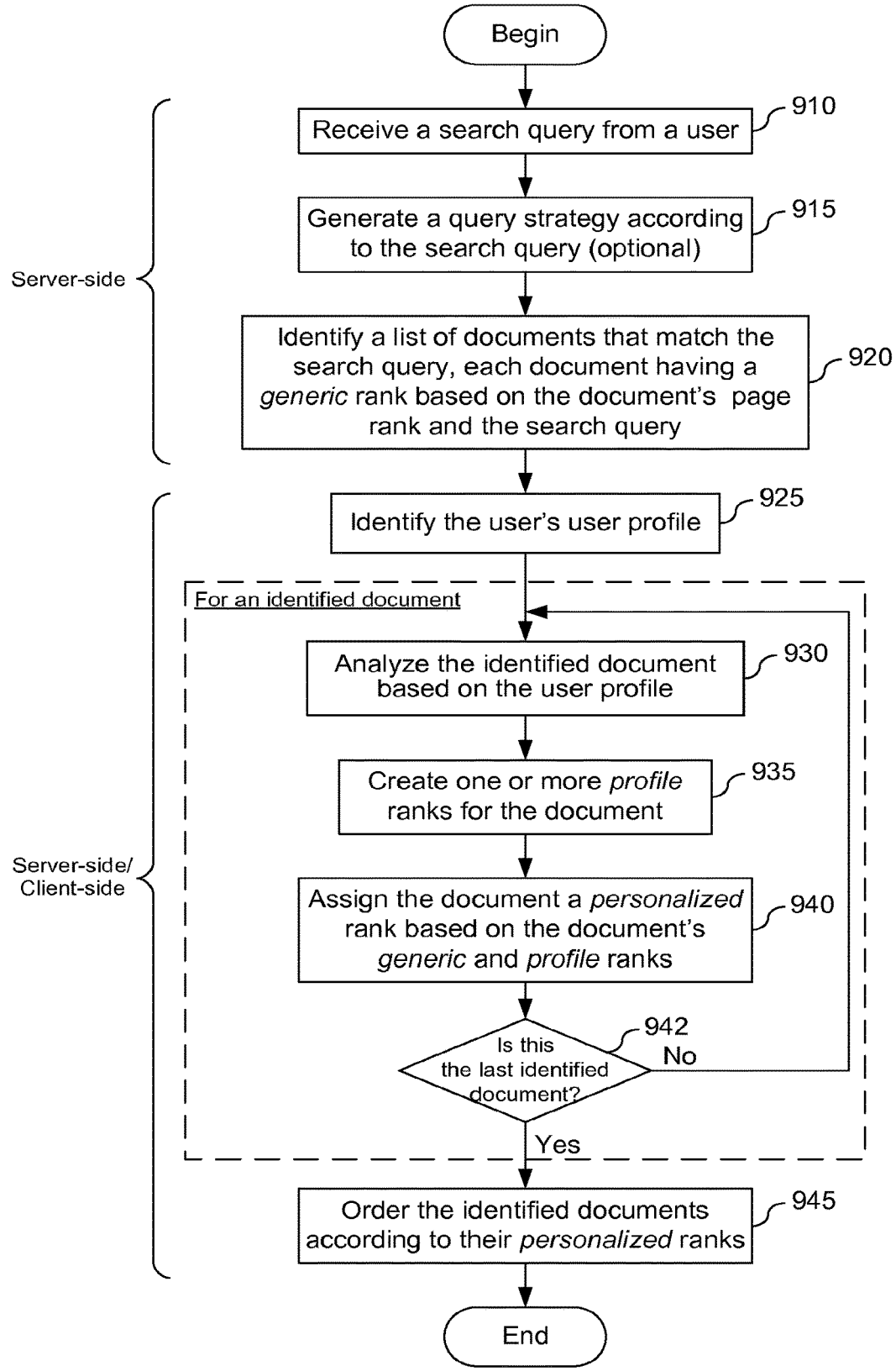
FIG. 9A is a flowchart illustrating a personalized web search process according to one embodiment.
Figure 9B:
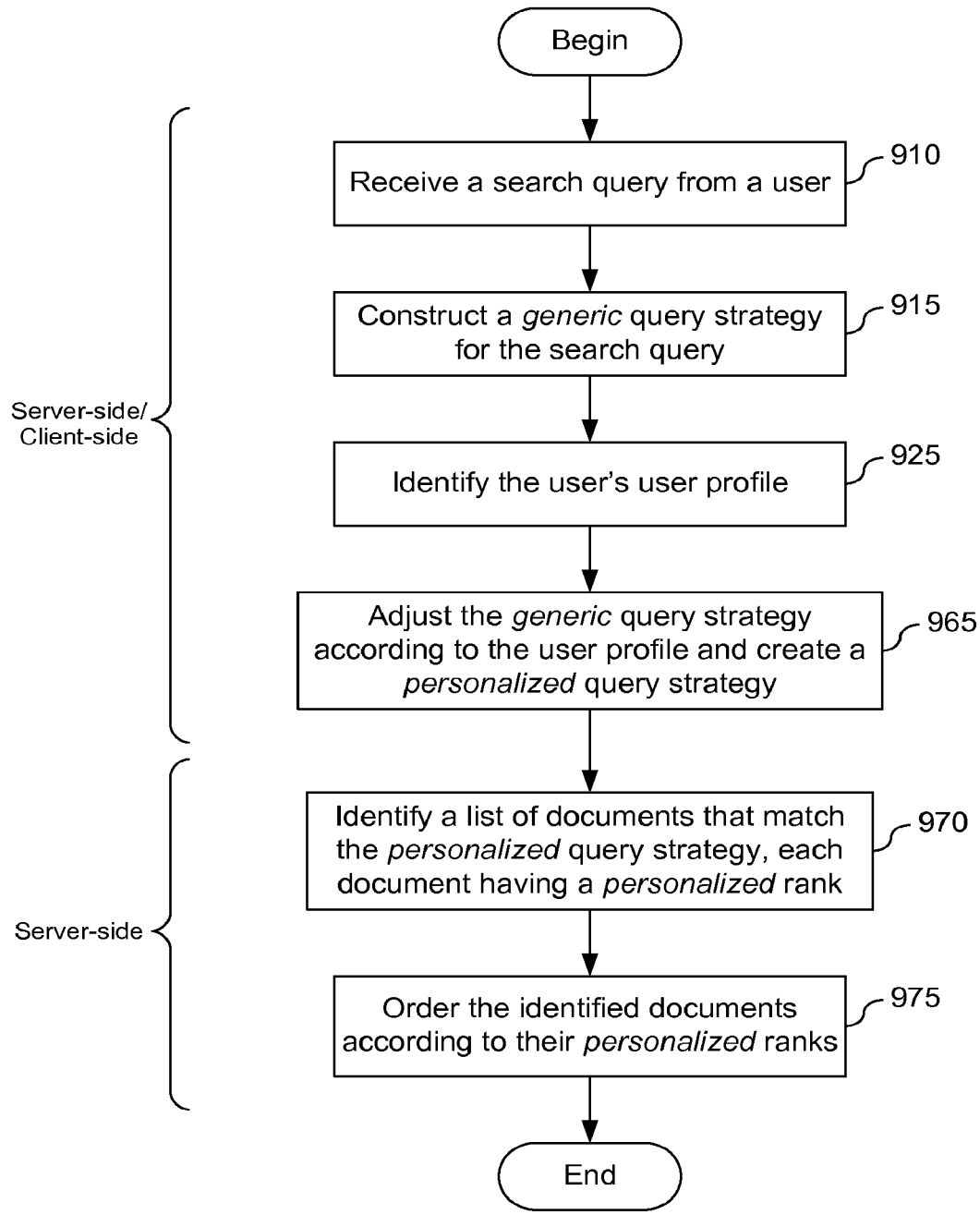
FIG. 9B is a flowchart illustrating a personalized web search process according to another embodiment.

FIGS. 9A and 9B represent two embodiments, both implemented in a client-server network environment such as the network environment 100 shown in FIG. 1. In the embodiment shown in FIG. 9A, the search engine 104 receives a search query from a client 102 at step 910 that is submitted by a particular user. In response, the search engine 104 may optionally generate a query strategy at step 915 (e.g., the search query is normalized so as to be in proper form for further processing, and/or the search query may be modified in accordance with predefined criteria so as to automatically broaden or narrow the scope of the search query). At step 920, the search engine 104 submits the search query (or the query strategy, if one is generated) to the content server 106. The content server identifies a list of documents that match the search query at step 920, each document having a generic score that depends on the document's page rank and the search query. In general, all the three operations (steps 910, 915 and 920) are conducted by the search engine system 107, which is on the server side of the network environment 100. There are two options on where to implement the operations following these first three steps.

In some embodiments that employ a server-side implementation, the user's identification number is embedded in the search query. Based on the user's identification number, the user profile server 108 identifies the user's user profile at step 925. Starting from step 930, the user profile server 108 or the search engine 104 analyzes each document identified at step 920 to determine its relevance to the user's profile, creates a profile score for the identified document at step 935 and then assigns the document a personalized score that is a function of the document's generic and profile scores at step 940. At step 942, the user profile server 108 or the search engine 104 checks whether this the last one in the list of identified documents. If no, the system processes the next document in the list. Otherwise, the list of documents are re-ordered according to their personalized scores at step 945 and then sent to the corresponding client from which the user submitted the search query.

Embodiments using a client-side implementation are similar to the server-side implementation, except that after step 920, the identified documents are sent to the corresponding client from which the user submitted the query. This client stores the user's user profile and it is responsible for re-ordering the documents based upon the user profile. Therefore, this client-side implementation may reduce the server's workload. Further, since there is no privacy concern with the client-side implementation, a user may be more willing to provide private information to customize the search results. However, a significant limitation to the client-side implementation is that only a limited number of documents, e.g., the top 50 documents (as determined using the generic rank), may be sent to a client for re-ordering due to limited network bandwidth. In contrast, the server-side implementation may be able to apply a user's profile to a much larger number of documents, e.g., 1000, that match the search query. Therefore, the client-side implementation may deprive a user access to those documents having relatively low generic ranks, but significantly high personalized ranks.

FIG. 9B illustrates another embodiment. Unlike the embodiment depicted in FIG. 9A, where the search query is not personalized before submitting the search query to the search engine 104, a generic query strategy is adjusted (step 965) according to the user's user profile to create a personalized query strategy. For example, relevant terms from the user profile may be added to the search query with associated weights. The creation of the personalized query strategy can be performed either on the client side or on the server side of the system. This embodiment avoids the network bandwidth restriction facing the previous embodiment. Finally, the search engine 104 submits the personalized query strategy to the content server 106 (step 970), and therefore the search results returned by the content server have already been ordered by the documents' personalized ranks (step 975).

The profiles of a group of users with related interests may be combined together to form a group profile, or a single profile may be formed based on the documents identified by the users in the group. For instance, several family members may use the same computer to submit search queries to a search engine. If the computer is tagged with a single user identifier by the search engine, the "user" will be the entire family of users, and the user profile will represent a combination or mixture of the search preferences of the various family members. An individual user in the group may optionally have a separate user profile that differentiates this user from other group members. In operation, the search results for a user in the group are ranked according to the group profile, or according to the group profile and the user's user profile when the user also has a separate user profile.

It is possible that a user may switch his interests so dramatically that his new interests and preferences bear little resemblance to his user profile, or a user may be temporarily interested in a new topic. In this case, personalized search results produced according to the embodiments depicted in FIGS. 9A and 9B may be less favorable than search results ranked in accordance with the generic ranks of the documents in the search results. Additionally, the search results provided to a user may not include new websites among the top listed documents because the user's profile tends to increase the weight of older websites which the user has visited (i.e., older websites from which the user has viewed or downloaded web pages) in the past.

To reduce the impact caused by a change in a user's preferences and interests, the personalized search results may be merged with the generic search results. In one embodiment, the generic search results and personalized search results are interleaved, with the odd positions (e.g., 1, 3, 5, etc.) of a search results list reserved for generic search results and the even positions (e.g., 2, 4, 6, etc.) reserved for personalized search results, or vice versa. Preferably, the items in the generic search results will not duplicate the items listed in the personalized search results, and vice versa. More generally, generic search results are intermixed or interleaved with personalized search results, so that the items in the search results presented to the user include both generic and personalized search results.

In another embodiment, the personalized ranks and generic ranks are further weighted by a user profile's confidence level. The confidence level takes into account factors such as how much information has been acquired about the user, how close the current search query matches the user's profile, how old the user profile is, etc. If only a very short history of the user is available, the user's profile may be assigned a correspondingly low confidence value. The final score of an identified document can be determined as:

$$FinalScore=ProfileScore*ProfileConfidence+GenericScore*(1-ProfileConfidence).$$

When intermixing generic and personalized results, the fraction of personalized results may be adjusted based on the profile confidence, for example using only one personalized result when the confidence is low.

Sometimes, multiple users may share a machine, e.g., in a public library. These users may have different interests and preferences. In one embodiment, a user may explicitly login to the service so the system knows his identity. Alternatively, different users can be automatically recognized based on the items they access or other characteristics of their access patterns. For example, different users may move the mouse in different ways, type differently, and use different applications and features of those applications. Based on a corpus of events on a client and/or server, it is possible to create a model for identifying users, and for then using that identification to select an appropriate "user" profile. In such circumstances, the "user" may actually be a group of people having somewhat similar computer usage patterns, interests and the like.

Figure 10:
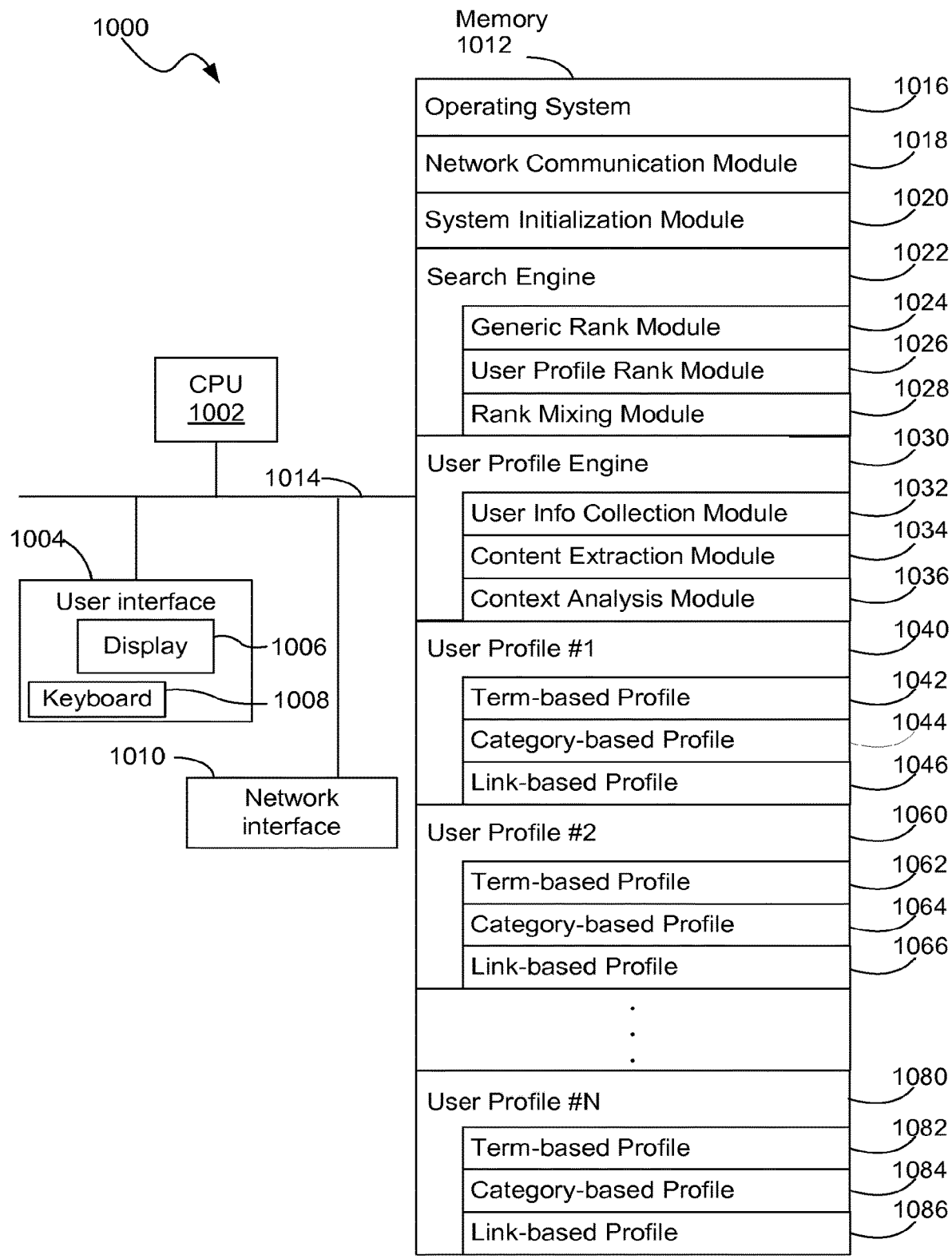
FIG. 10 is a block diagram of a personalized search engine.

Referring to FIG. 10, a personalized search engine system 1000 typically includes one or more processing units (CPU's) 1002, one or more network or other communications interfaces 1010, memory 1012, and one or more communication buses 1014 for interconnecting these components. The system 1000 may optionally include a user interface 1004, for instance a display 1006 and a keyboard 1008. Memory 1012 may include high speed random access memory and may also include non-volatile memory, such as one or more magnetic disk storage devices. Memory 1012 may include mass storage that is remotely located from the central processing unit(s) 1002. The memory 1012 preferably stores:

- an operating system 1016 that includes procedures for handling various basic system services and for performing hardware dependent tasks;
- a network communication module 1018 that is used for connecting the system 1000 to other servers or computers via one or more communication networks (wired or wireless), such as the Internet, other wide area networks, local area networks, metropolitan area networks, and so on;
- a system initialization module 1020 that initializes other modules and data structures stored in memory 1012 required for the appropriate operation of system 1000;
- a search engine 1022 for processing a search query, identifying and ordering search results according to the search query and a user's profile;
- a user profile engine 1030 for gathering and processing user information, such as the user information identified in FIG. 2, and creating and updating a user's user profile that characterizes the user's search preferences and interests; and
- data structures 1040, 1060 and 1080 for storing a plurality of user profiles.

The search engine 1022 may further comprise:

- a generic rank module (or instructions) 1024 for processing a search query submitted by a user, identifying a list of documents matching the query and assigning each identified document a generic rank without reference to user specific information;
- a user profile rank module (or instructions) 1026 for correlating each of a plurality of documents identified by the generic rank module 1024 with the user's user profile and assigning the document a profile rank indicating the relevance of the document to the user's search preferences and interests; and
- a rank mixing module (or instructions) 1028 for combining the generic rank and the profile rank of an identified document into a personalized rank and re-ordering the list of documents according to their personalized ranks.

In some embodiments, these modules 1024, 1026, 1028 may be implemented within a single procedure or in a set of procedures that reside within a single software module.

The user profile engine 1030 may further comprise:

- a user information collection module 1032 for collecting and assorting various user information listed in FIG. 2;
- a document content extraction module 1034 for selecting and extracting content from the documents identified by the user, to identify content relevant to the user's interests, using techniques such as paragraph sampling (as discussed above); and
- a context analysis module 1036 for analyzing the content extracted by the document extraction module 1034 so as to identify terms that characterize a user's search preferences.

Each data structure hosting a user profile may further comprise:

- a data structure 1042, 1062 or 1082 for storing a term-based user profile;
- a data structure 1044, 1064 or 1084 for storing a category-based user profile; and
- a data structure 1046, 1066 or 1086 for storing a link-based user profile.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of personalizing search results of a search engine, the method comprising:
   accessing a user profile for a user, wherein the user profile is based at least in part on information about the user, the user profile including information derived from a set of documents, the set of documents including documents identified by search results from the search engine, documents accessed by the user, documents linked to documents identified by search results from the search engine, and documents linked to the user accessed documents;

receiving a search query from the user;
identifying a set of documents in response to the search query, each document being associated with a generic score that is independent of the user profile;
assigning a personalized score to each of at least a subset of the identified set of documents, the personalized score being based, at least in part, on the user profile; and
determining a final score for each document in the subset of the identified set of documents, the final score being a function of the personalized score for the document, the generic score associated with the document, and a confidence score accounting for one or more of: a quantity of information acquired about the user, how closely the search query matches the user profile, and an age of the user profile; and
providing, in accordance with the final scores, results identifying at least a subset of the identified set of documents to a client system associated with the user,
wherein providing the results includes providing at least one result based at least in part on the personalized score for the corresponding document and providing other results of the obtained search results in accordance with the generic scores for the documents corresponding to the other results but independent of the user profile.

2. The method of claim 1, the method further comprising:
ranking the subset of the set of search result documents according to their final scores;
and wherein determining the final score for a document includes weighting both the personalized score and the generic score in accordance with the confidence score.

3. The method of claim 1, wherein the user profile comprises information about terms, each term associated with a weight indicating importance of the term to the user.

4. The method of claim 1, wherein the user profile comprises information about categories, each category associated with a weight indicating a correlation between search preferences of the user and the category.

5. The method of claim 1, wherein the user profile comprises links, each link associated with a weight indicating relevance of the link to search preferences of the user.

6. A search engine system, comprising:
one or more central processing units for executing programs;
an interface for receiving information; and
a search engine module executable by the one or more central processing units, the search engine module comprising:
instructions for accessing a user profile for a user;
instructions for receiving a search query from the user;
instructions for obtaining, from a search engine to which the search query is provided, search results identifying a set of search result documents responsive to the search query, each document being associated with a generic score that is independent of the user profile;
instructions for determining a personalized score for each document of at least a subset of the set of search result documents, in accordance with the user profile;
instructions for determining a final score for each document in at least said subset of the set of search result documents as a function of the personalized score for the document, the generic score associated with the document, and a confidence score corresponding to a confidence level in the user profile, the confidence score accounting for one or more of: quantity of information acquired about the user, how closely the search query matches the user profile, and an age of the user profile; and
instructions for providing, in accordance with the final scores, results identifying at least a subset of the set of search result documents to a client system associated with the user,
wherein providing results identifying at least a subset of the set of search result documents includes providing at least one result of the obtained search results in accordance with the personalized score for the corresponding document and providing other results of the obtained search results in accordance with the generic scores for the documents corresponding to the other results but independent of the user profile.

7. The search engine system of claim 6, the search engine module including:
instructions for ranking the subset of the set of search result documents according to their final scores; and
wherein determining the final score includes weighting both the personalized score and the generic score in accordance with the confidence score.

8. The search engine system of claim 6, wherein the user profile comprises information about terms, each term associated with a weight indicating importance of the term to the user.

9. The search engine system of claim 6, wherein the user profile comprises information about categories, each category associated with a weight indicating a correlation between search preferences of the user and the category.

10. The search engine system of claim 6, wherein the user profile comprises links, each link associated with a weight indicating relevance of the link to search preferences of the user.

11. A non-transitory computer readable storage medium storing one or more programs for execution by one or more processors, the one or more programs comprising:
instructions for accessing a user profile for a user;
instructions for receiving a search query from the user;
instructions for obtaining, from a search engine to which the search query is provided, search results identifying a set of search result documents responsive to the search query, each document being associated with a generic score that is independent of the user profile;
instructions for determining a personalized score for each document of at least a subset of the set of search result documents, in accordance with the user profile;
instructions for determining a final score for each document in at least said subset of the set of search result documents as a function of the personalized score for the document, the generic score associated with the document, and a confidence score corresponding to a confidence level in the user profile, the confidence score accounting for one or more of: a quantity of information acquired about the user, how closely the search query matches the user profile, and an age of the user profile; and
instructions for providing, in accordance with the final scores, results identifying at least a subset of the set of search result documents to a client system associated with the user,
wherein providing results identifying at least a subset of the set of search result documents includes providing at least one result of the obtained search results in accordance with the personalized score for the corresponding document and providing other results of the obtained search results in accordance with the generic scores for the documents corresponding to the other results but independent of the user profile.

12. The non-transitory computer readable storage medium of claim 11, the one or more programs further including:
   instructions for ranking the subset of the set of search result documents according to their final scores; and
   wherein determining the final score includes weighting both the personalized score and the generic score in accordance with the confidence score.

13. The non-transitory computer readable storage medium of claim 11, wherein the user profile comprises information about terms, each term associated with a weight indicating importance of the term to the user.

14. The non-transitory computer readable storage medium of claim 11, wherein the user profile comprises information about categories, each category associated with a weight indicating a correlation between search preferences of the user and the category.

15. The non-transitory computer readable storage medium of claim 11, wherein the user profile comprises links, each link associated with a weight indicating relevance of the link to search preferences of the user.

* * * * *

UNITED STATES PATENT AND TRADEMARK OFFICE
CERTIFICATE OF CORRECTION

| | | |
|---|---|---|
| PATENT NO. | : 10,839,029 B2 | Page 1 of 1 |
| APPLICATION NO. | : 15/059826 | |
| DATED | : November 17, 2020 | |
| INVENTOR(S) | : Stephen Lawrence | |

It is certified that error appears in the above-identified patent and that said Letters Patent is hereby corrected as shown below:

In the Claims

In Column 19, Claim 1, Lines 7-8, delete "profile; and" and insert --profile;--, therefor.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*